US006120903A

United States Patent [19]

Hausmann et al.

[11] Patent Number: 6,120,903

[45] Date of Patent: Sep. 19, 2000

[54] MULTILAYERED, FLAT SHAPED PART WITH A VISIBLE SIDE AND A SUPPORT LAYER

[75] Inventors: Heinz Hausmann, Leichlingen; Joachim Petzoldt, Monheim; Reinhold Dederichs; Elke Springer, both of Leverkusen, all of Germany

[73] Assignee: Baker Aktiengesellschaft, Leverkusen, Germany

[21] Appl. No.: 09/242,316

[22] PCT Filed: Aug. 7, 1997

[86] PCT No.: PCT/EP97/04301

§ 371 Date: Feb. 12, 1999

§ 102(e) Date: Feb. 12, 1999

[87] PCT Pub. No.: WO98/07774

PCT Pub. Date: Feb. 26, 1998

[30] Foreign Application Priority Data

Aug. 20, 1996 [DE] Germany .......................... 196 33 479

[51] Int. Cl.[7] .......................... B32B 27/00; B32B 27/40; C08G 18/34; C08G 18/42

[52] U.S. Cl. .................................... 428/423.3; 428/423.1; 427/372.2; 427/384; 427/402; 528/80; 528/81; 528/83; 528/84; 4/538

[58] Field of Search ................................ 427/372.2, 384, 427/402; 428/423.1, 423.3; 528/80, 81, 83, 84; 4/538

[56] References Cited

FOREIGN PATENT DOCUMENTS

| | | |
|---|---|---|
| 399600 | 11/1990 | European Pat. Off. . |
| 4223993 | 5/1996 | Germany . |

*Primary Examiner*—Richard Weisberger
*Attorney, Agent, or Firm*—Joseph C. Gil; Lyndanne M. Whalen; Noland J. Cheung

[57] ABSTRACT

A multilayer flat molding with a visible side and a supporting layer, for example bathtubs or shower fittings, is described, the visible side consisting of a polyurethane surface coating layer and the supporting layer consisting of a reinforced polyurethane layer.

6 Claims, No Drawings

MULTILAYERED, FLAT SHAPED PART WITH A VISIBLE SIDE AND A SUPPORT LAYER

FIELD OF THE INVENTION

The present invention relates to a multilayer flat moulding with a visible or exposed side and a supporting layer, especially in the form of items of sanitary ware such as bathtubs or shower fittings. Multilayer flat mouldings according to the invention may in addition be used as internal and external linings and claddings, for example in dwellings, boat-building and the like.

BACKGROUND OF THE INVENTION

According to DE-A 4 223 993 it is known to fabricate the visible and used side of bathtubs and shower fittings from a thermoformed thermoplastic material, in particular polymethyl methacrylate, and to provide the rear side with a supporting polyurethane layer, the thermoformed moulding being used as a one-off mould for the polyurethane layer. The advantage of such articles of sanitary ware is that they can be recycled by separating the thermoplastic layer from the polyurethane layer simply by raising the temperature.

SUMMARY OF THE INVENTION

According to the invention it is now proposed to produce such multilayer, flat mouldings with a visible and optionally used side and a supporting layer, completely from polyurethane by first of all applying a substantially solvent-free polyurethane surface coating layer to a negative mould and then applying a polyurethane supporting layer to the still uncured polyurethane surface coating layer.

The present invention accordingly provides a multilayer, flat moulding having a visible side and a supporting layer, the visible side consisting of a polyurethane layer that has been obtained by curing a first mixture containing a1) surface coating polyisocyanates based on 1,6-diisocyanatohexane and/or isophorone diisocyanate having a viscosity of 100 to 10 000 mPa.s and a NCO content of 5 to 30 wt. %, b1) a polyester and/or polyether having a viscosity of 200 to 5000 mPa.s and a OH group content corresponding to a OH number of 33 to 1000, c1) optionally conventional pigments, fillers, additives and catalysts, as well as d1) optionally solvents in amounts of at most 5 wt. %, and the supporting layer consisting of a polyurethane layer that has been obtained by curing a second mixture containing a2) semi-prepolymers based on diphenylmethane diisocyanate and a polyether polyol having a NCO content of 20 to 30 wt. %, b2) polyether polyols having a OH number of 250 to 400, and c2) 10 to 60 wt. %, referred to the mixture, of reinforcing fillers and/or fibres.

Suitable surface coating polyisocyanates based on 1,6-diisocyanatohexane (HDI) are understood to be in particular HDI derivatives of the type known per se containing allophanate, biuret, isocyanurate, oxadiazine, uretdione and/or urethane groups, and having the aforementioned characteristic properties. Suitable compounds are thus for example polyisocyanates containing uretdione and/or isocyanurate groups of the type disclosed in EP-A-O 010 589, -0 089 297, -0 173 252, -0 178 520, -0 330 966, -0 337 116, -0 377 177, -0 456 062 and -0 495 307 or in DE-OS 32 19 608 and 38 10 908; polyisocyanates containing biuret groups of the types mentioned in EP-A-O 150 769 and -0 320 703, in U.S. Pat. Nos. 3,903,127, 3,976,622 and 4,028,392 or in DE-OS 28 08 801, 30 30 655 and 31 33 865; polyisocyanates containing allophanate and optionally isocyanurate groups of the type mentioned in EP-A-0 000 194, -0 496 208, -0 524 500, -0 524 501 and -0 566 037; polyisocyanates containing oxadiazine groups of the type mentioned in DE-OS 16 70 666, or arbitrary mixtures of such polyisocyanates.

DETAILED DESCRIPTION OF THE INVENTION

Preferred are surface coating polyisocyanates with a uretdione or alophanate and/or isocyanurate structure, which have a viscosity of 100 to 1500 mPa.s at 23° C. and a content of isocyanate groups of 17 to 24 wt. %, and a content of monomeric HDI of less than 0.5 wt. %.

Also suitable are surface coating isocyanates based on isophorone diisocyanate (IPDI) containing allophanate or isocyanurate groups, with a content of isocyanate groups of 10 to 25 wt. % and a content of monomeric diisocyanates of less than 0.5 wt. %.

The preparation of such isocyanurate group-containing polyisocyanates based on IPDI is known and is described for example in EP-A-0 003 765, -0 017 998 or -0 193 828 or in DE-OS 19 34 763 and 26 44 684.

Preferably surface coating polyisocyanates are used that contain between 10 and 60 wt. % of a biuret based on 1,6-diisocyanatohexane. The correct viscosity consistency for application is thereby lowered and the pot life is increased, and in addition curing is accelerated at elevated temperatures. The mixture of surface coating polyisocyanates preferably used according to the invention has a viscosity of 100 to 10 000 mPa.s, particularly preferably of 200 to 5000 mPa.s.

Polyhydroxyl compounds known per se of the polyester and polyether type are suitable as polyol component b1) or as a constituent of the polyol component b1).

The polyester polyols can be prepared in a manner and procedure known per se by reacting polyhydric alcohols with sub-stoichiometric amounts of polybasic carboxylic acids, corresponding carboxylic acid anhydrides, corresponding polycarboxylic acid esters of lower alcohols, or lactones.

Suitable polyhydric alcohols for preparing these polyester polyols are in particular those in the molecular weight range from 62 to 400, for example 1,2-ethanediol, 1,2- and 1,3-propanediol, the isomeric butanediols, pentanediols, hexanediols, heptanediols and octanediols, 1,2- and 1,4-cyclohexanediols, 1,4-cyclohexanedimethanol, 4,4'-(1-methylethylidene)-biscyclohexanol, 1,2,3-propanetriol, 1,1,1-trimethylol ethane, 1,2,6-hexanetriol, 1,1,1-trimethylol propane, 2,2-bis(hydroxymethyl)-1,3-propanediol or 1,3,5-tris(2-hydroxyethyl)-isocyanurate.

The acids or acid derivatives used to prepare the polyester polyols may be of an aliphatic, cycloaliphatic and/or heteroaromatic nature and may optionally be substituted, for example by halogen atoms, and/or may be unsaturated. Examples of suitable acids are polybasic carboxylic acids in the molecular weight range 118 to 300 or their derivatives, for example succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, terephthalic acid dimethyl ester, and terephthalic acid-bis-alycol ester.

Arbitrary mixtures of these starting compounds mentioned by way of example may also be used to prepare the polyester polyols.

Preferred polyester polyols are however those that can be prepared in a manner known per se from lactones and simple polyhydric alcohols, for example the compounds mentioned above by way of example as starter molecules, with ring opening. Suitable lactones for preparing these polyester polyols are for example β-propiolactone, γ-butyrolactone, γ- and δ-valerolactone, ε-caprolactone, 3,5,5- and 3,3,5-trimethyl caprolactone, or arbitrary mixtures of such lactones.

The preparation is generally carried out in the presence of catalysts, for example Lewis or Bronstedt acids, organic tin or titanium compounds, at temperatures from 20° to 200° C., preferably 50° to 160° C.

The polyether polyols can be prepared in a manner known per se by alkoxylation of suitable starter molecules. To prepare these polyether polyols, arbitrary polyhydric alcohols, for example in the molecular weight range from 62 to 400 as have been described above in the preparation of polyester polyols, may be used as starter molecules.

Suitable alkylene oxides for the alkoxylation reaction are in particular ethylene oxide and propylene oxide, which may be used in an arbitrary order or also in a mixture in the alkoxylation reaction.

The alkylene oxide units of the polyether polyols preferably consist in an amount of at least 80%, but most preferably exclusively, of propylene oxide units.

The mixture for producing the visible or exposed side may contain, besides the aforementioned two-component binders, auxiliaries and additives c1), conventionally used in coating technology for example fillers, pigments, curing catalysts, UV protective agents, antioxidants, microbicidal and algicidal agents, water-trapping agents, thixotropic agents, wetting agents, flow improvement agents, flatting agents, anti-skid agents, venting agents or extenders. The auxiliaries and additives c1) are mixed in with the a1) and b1) components depending on the requirements of the problems to be solved by the application of the coating and their compatibility.

Suitable fillers include for example barytes, talcum, stone or plastics granules, glass spheres, sand or cork, which may optionally be added in amounts of up to 200 wt. %, referred to the binder mixture consisting of the individual components a1) and b1).

Suitable pigments are for example barytes, talcum, titanium dioxide, zinc oxide, iron oxides, chromium oxides or carbon black. A detailed review of pigments for coating materials is given in "Lehrbuch der Lacke und Beschichtungen, Band II, Pigmente, Fullstoffe, Farbstoffe", (Manual of Paints and Coatings, Vol. II, Pigments, Fillers, Dyestuffs), Kittel, Verlag W. A. Colomb in der Heenemann GmbH, Berlin-Oberschwandorf, 1974, p. 17–265. The pigments mentioned by way of example may, if at all, be used in amounts of up to 100%, referred to the binder mixture consisting of the individual components a1) and b1).

Furthermore, catalysts known per se from polyurethane chemistry may also be included. Examples of suitable catalysts include the known lead or bismuth compounds, and preferably the tin compounds and tertiary amines known in this connection, as are described in more detail for example in "Kunststoff Handbuch 7, Polyurethane" (Plastics Handbook 7, Polyurethanes) Carl-Hanser-Verlag, Munich—Vienna, 1984, pp. 97–98. Such catalysts may be used, if at all, in amounts of up to 2 wt. % referred to the weight of the binder consisting of the individual components a1) and b1).

Further auxiliaries and additives that may optionally be used include for example UV protection agents, antioxidants, microbicidal and algicidal agents, water-trapping agents, thixotropic agents, wetting agents, flow improvement agents, flatting agents, anti-skid agents, venting agents or extenders. Such auxiliaries and additives are described for example in "Lehrbuch der Lacke und Beschichtungen, Band III, Losemittel, Weichmacher, Additive, Zwischenprodukte", (Manual of Paints and Coatings, Vol. III, Solvents, Plasticisers, Additives, Intermediates), H. Kittel, Verlag W. A. Colomb in der Heenemann GmbH, Berlin-Oberschwandorf, 1976, pp. 237–398. Desiccants acting as water-trapping agents are described in more detail for example in "Kunstoff Handbuch 7, Polyurethane", Carl-Hanser-Verlag,, Munich—Vienna, 1983, p. 545. The total amount of such further auxiliaries and additives is in general 0 to 25 wt. %, referred to the binder consisting of the individual components a1) and b1).

It is essential that the first mixture forming the visible side has as low a solvent content as possible, since otherwise with relatively large layer thicknesses and in particular after applying the second mixture forming the supporting layer, bubbles can form during the curing. Small amounts of solvents may however promote pigment wetting when using pigments and fillers.

The components a1) and b1) are mixed in such a ratio according to the conventional methods of polyurethane chemistry that the isocyanate index is 90 to 130.

In order to prepare the second mixture, polyether polyols having a OH number of 250 to 400 are used, preferably a mixture of polyether polyols, the mixture having a mean OH number of 250 to 400. The polyether polyol particularly preferably consists of a first component having a OH number of 350 to 550 and a second component having a OH number of 30 to 50.

The isocyanate component is used in the form of a semi-prepolymer based on diphenylmethane-4,4'-diisocyanate (MDI) and polyether polyols having a NCO content of 20 to 30 wt. %. In addition, minor amounts (less than 3 wt. %, preferably below 1 wt. %) of chain extenders, for example low molecular weight diamines, condensation catalysts, for example diaza-dicylco-octane, defoaming agents, for example polyether siloxanes and other modifiers may be added to the second mixture. The quantitative ratio of polyether polyols to isocyanate components is preferably chosen so that the isocyanate index is 90 to 130.

Suitable reinforcing fillers are in particular mineral fillers. Fibres, in particular short glass fibres of 3 to 15 μm diameter and 0.3 to 3 mm long are however preferably used.

The mixtures are prepared continuously in mixers according to conventional procedures known in polyurethane chemistry, and are applied to a negative mould by spraying or pouring. The first mixture forming the visible side is first of all applied and, before this has cured, the second mixture is applied for the supporting layer. The two layers are cured together at a temperature of 20 to 120° C., preferably 40 to 100° C., over a period of 15 minutes to 24 hours, depending on the curing temperature.

The layer forming the visible side is preferably 0.2 to 0.7 mm thick. The supporting layer may be between 2 and 10 mm thick, depending on the intended area of use of the multilayer flat moulding. The thickness of the supporting layer may however vary, so that sites that are subject to greater stress are made thicker. Furthermore, the supporting layer may be fabricated in the form of a sandwich of unfoamed and foamed polyurethane by applying the second mixture as several layers, a blowing agent being added to a middle layer.

What is claimed is:

1. A multilayer, flat molding having a visible side and a supporting layer, said visible side consisting of a polyurethane layer that has been obtained by curing a first mixture containing:

a1) surface coating polyisocyanates based on 1,6-diisocyanatohexane and/or isophorone diisocyanate having a viscosity of 100 to 10,000 mPa·s and an NCO content of 5 to 30 wt. %, b1) a polyester and/or polyether having a viscosity of 200 to 5000 mPa·s and an OH group content corresponding to an OH number of 33 to 1000, c1) optionally, conventional pigments, fillers, additives and catalysts, as well as d1) optionally, solvents in amounts of at most 5 wt. %, and the supporting layer consisting of a polyurethane layer that has been obtained by curing a second mixture containing a2) semi-prepolymers based on diphenylmethane diisocyanate and a polyether polyol having an NCO content of 20 to 30 wt. %, b2) polyether polyols having an OH number of 250 to 400, and c2) 10 to 60 wt. % based on said second mixture, of reinforcing fillers and/or fibers.

2. A molding according to claim 1, wherein the component a1) contains a biuret based on 1,6-diisocyanatohexane in an amount of 10 to 60 wt. % based on said component a1).

3. A molding according to claim 1, wherein said molding is in the form of a shower fitting.

4. A molding according to claim 1, wherein the layer forming the visible side is 0.2 to 0.7 mm thick.

5. A molding according to claim 1, wherein said molding is in the form of a bathtub.

6. A process of producing moldings comprising the steps of:

a) applying a polyurethane layer that has been obtained by curing a first mixture to a mold to form a visible side of said molding; said first mixture containing i) surface coating polyisocyanates based on 1,6-diisocyanatohexane and/or isophorone diisocyanate having a viscosity of 100 to 10,000 mPa·s and an NCO content of 5 to 30 wt. %, ii) a polyester and/or polyether having a viscosity of 200 to 5000 mPa·s and an OH group content corresponding to an OH number of 33 to 1000, iii) optionally, conventional pigments, fillers, additives and catalysts, as well as iv) optionally, solvents in amounts of at most 5 wt. %;

b) applying a supporting layer consisting of a polyurethane layer that has been obtained by curing a second mixture containing i) semi-prepolymers based on diphenylmethane diisocyanate and a polyether polyol having an NCO content of 20 to 30 wt. %, ii) polyether polyols having an OH number of 250 to 400, and iii) 10 to 60 wt. % based on said second mixture, of reinforcing fillers and/or fibers.

* * * * *